Sept. 18, 1934.  W. G. CALKINS  1,974,173
POROUS METAL BEARING COMPOSITION

Filed Nov. 13, 1930

INVENTOR
WILLIAM G. CALKINS.
BY
ATTORNEY

Patented Sept. 18, 1934

1,974,173

UNITED STATES PATENT OFFICE 1,974,173

POROUS METAL BEARING COMPOSITION

William G. Calkins, Detroit, Mich., assignor to Chrysler Corporation, Detroit, Mich., a corporation of Delaware Application November 13, 1930, Serial No. 495,546

3 Claims. (Cl. 75—1)

This invention relates to an improved bearing and bearing composition of the porous metal type.

The main objects of the invention are to provide a porous metal, lubricant retaining composition which consists mainly of an inexpensive component that produces structural and mechanical properties, such as strength and hardness, of a large degree; to provide an improved comminuted component in a porous metal composition which includes extremely porous particles that have a decided capacity for adhering together after being compressed in a briquetting operation; to provide a porous metal composition in which sponge iron predominates; to provide a suitable binder which fuses readily with the sponge iron particles and rigidly binds the same together.

Further objects of the invention are to provide a porous bearing composition that has a coefficient of thermal expansion substantially equal to that of the ferrous metal in which bearings are generally supported so as to obviate binding of the journaled parts of a device which heretofore has been caused by uneven expansion of prior porous bearing materials and their supporting structures; to provide a composition of this kind which requires only a small degree of clearance to be allowed between the bearing and the member journaled therein; and to provide a porous bearing which includes a preponderance of ferrous particles that are susceptible to hardening by carbonizing and a subsequent heat treatment.

An illustrative embodiment of my invention is shown in the accompanying drawing, in which.

Figure 1:
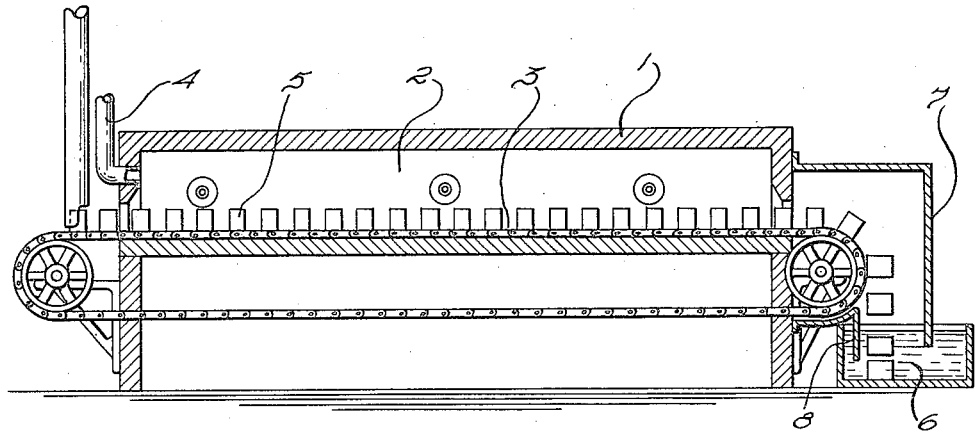
Fig. 1 is a vertical section of a muffle furnace illustrating, diametrically, the sintering and quenching operations involved in the production of the improved bearings.
Figures 2, 3:
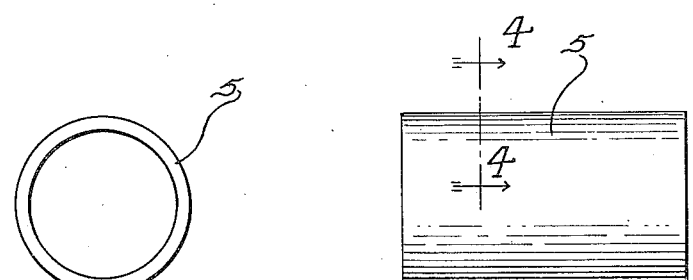
Fig. 2 is an end view of a journal bearing which is formed of my improved porous composition.
Fig. 3 is a side elevation of the bearing shown in Fig. 2.

Heretofore in the production of porous bearing compositions, it has been customary to use ingredients of bronze, such as copper and tin, in various proportions. In some instances, a small percentage of iron has been included in porous bearing metals, but in these cases the copper generally forms the body of the composition and the tin serves as a bonding element while the iron particles merely present hard bearing areas in the bearing surface. In no instance is it found that the structural strength of iron has been obtained in bearings of this kind.

In general, the invention relates to the formation of bearings in which finely comminuted iron particles are bonded together with metal which has a melting point that is considerably below the melting point of iron. Bearings having this composition have structural strength and mechanical hardness of a degree much higher than the structural strength and hardness of nonferrous porous bearings and therefore they are adapted for use where the journaled parts of a device sustain considerable weight and are subjected to intensive loads.

The improved bearing composition is preferably formed by mixing together with 10 parts of powdered copper, by weight, substantially 88.5 parts of sponge iron which is a finely comminuted amorphous iron powder having particles that are highly porous or sponge like, as the name indicates. Sponge iron may be produced by direct gas reduction of iron ore or oxides of iron such as powdered ferric and ferrous oxides. To this mixture is added substantially 1.5 parts of graphite. A small amount of lubricant, either liquid such as petroleum oil, or solid such as stearic acid is then incorporated in the mixture of powdered metals to aid in the subsequent briquetting operation. When stearic acid is used, it is found advantageous to add the lubricant while dissolved in ether so as to permit the lubricant to be thoroughly distributed throughout the mixture.

The mixture of powdered metals, graphite and lubricant are then placed in a mould and subjected to compression of from 25,000 to 50,000 pounds per square inch. Under such pressures, the particles of sponge iron are compact and felted closely together forming briquettes of sharply defined shapes that are self sustaining in shape.

The briquettes are then sintered at a temperature of substantially 2100° Fahrenheit in a reducing or non-oxidizing atmosphere. This may be accomplished by heating the briquettes in a muffle furnace of the type shown in Fig. 1 which includes a casing 1 having a heating chamber or oven 2 through which a continuous conveyor 3 passes. The oven 2 of the furnace is provided with an inlet 4 through which hydrogen, nitrogen or other reducing or inert gases are supplied. The furnace may be electrically heated or gas fired in any desirable manner so as to maintain a temperature of substantially 2100° Fahrenheit.

Bearings 5 are deposited upon the endless conveyor 3 in the left end of the furnace, as viewed in Fig. 1, and they are moved through the oven of the furnace at a predetermined rate. As the bearings reach the right end of the conveyor 3 they are dumped into a quenching bath 6 in which they are allowed to cool before they are removed. The lower edge portions or walls 7 and 8 of the casing 1 are submerged in the liquid of the bath 6 forming a liquid seal for preventing the gas which is introduced through the inlet 4 from escaping.

Figure 4:
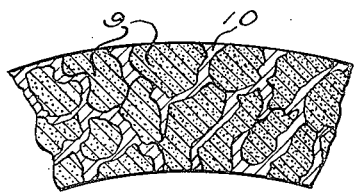
Fig. 4 is an enlarged fragmentary section taken on the line 4—4 of Fig. 3, and illustrating the structure of my improved composition.

The resulting bearing has an internal structure similar to that illustrated in Fig. 4 wherein the iron particles 9 are bonded together by particles of copper 10 which are fused to the iron constituent. The sponge like nature of the iron particles renders the bearing extremely porous.

In some instances, it is desirable to harden the bearing material more than the hardness of the shaft which it is to receive so as to maintain a hardness differential between the shaft and the bearing without hardening the shaft, this hardness differential being essential to prevent friction between the engaged surfaces of the bearing and shaft. Bearings of the above type may be conveniently hardened by packing them, while hot in a body of coke or other carbonaceous matter and allowing them to cool while in the presence of the carbon, or they may be carbonized by a treatment with carbonaceous gases. A subsequent heat treatment of a carbonized bearing produces a composition which though porous has the hardness and properties of steel.

Hardening of the bearing may also be accomplished by carbonizing the particles of sponge iron before they are mixed with copper and compressed. In this case, the bearings are hardened as they are quenched after leaving the muffle furnace.

Porous bearings which have as their main body portion, finely divided particles of iron that are secured together by copper or other metal having a suitable melting point such as tin or spelter have structural properties which are substantially equivalent to cast iron and they will withstand much higher loads of pressure and impact than bronze bearings of the porous metal type.

The coefficient of expansion of sintered iron bearings is substantially the same as that of the ferrous metals in which bearings of this type are generally mounted and as a result, the bearings, when heated during use do not bind upon the shaft. By equalizing the coefficients of expansion of the bearing with that of its support, the necessity of allowing a large degree of clearance between the inner periphery of the bearing and the outer periphery of the shaft is obviated and the parts of a device which are journaled in bearings of this type may be more accurately aligned.

The proportions of the copper and iron components may be varied from those recited as one example of a satisfactory composition. From 5 to 20% of copper, by weight, may be used, but in order to obtain a bearing having, in general, the properties of iron, it is necessary to use a preponderant quantity of iron either in the form of sponge iron or powdered iron.

Although but one specific embodiment of this invention is herein disclosed, it will be understood that various equivalents may be substituted for the ingredients herein recited and numerous changes may be made in the proportions of such ingredients without departing from the spirit and scope of my invention as set forth in the claims hereto appended.

What I claim is:

1. A porous sintered bearing including, by weight, substantially 88.5 parts of finely comminuted iron; 10 parts of powdered copper, and 1.5 parts of graphite.

2. A porous bearing including a sintered composition having substantially 88.5 parts, by weight, of sponge iron, 10 parts of metallic binder composed of at least one of the metals copper, zinc and tin, and 1.5 parts of graphite.

3. A porous sintered bearing including, by weight, substantially 88.5 parts of finely comminuted iron; 10 parts of powdered brass, and 1.5 parts of graphite.

WILLIAM G. CALKINS.